Patented Feb. 1, 1938

2,107,261

UNITED STATES PATENT OFFICE 2,107,261

FERMENTATION OF BEET MOLASSES

David A. Legg, Terre Haute, and Noble R. Tarvin, Brazil, Ind., assignors to Commercial Solvents Corporation, Terre Haute, Ind., a corporation of Maryland No Drawing. Application July 30, 1934, Serial No. 737,574

9 Claims. (Cl. 195—44)

The present invention relates to the production of valuable products by the fermentation of beet molasses. More particularly, this invention relates to the butyl alcohol fermentation of beet molasses by means of bacteria of the general type *Clostridium saccharo-acetobutylicum.*

The fermentation of soluble carbohydrate mashes, in general, by means of bacteria of the group *Clostridium saccharo-acetobutylicum* has been disclosed in copending application U. S. Ser. No. 675,459 by J. C. Woodruff, D. A. Legg, and H. R. Stiles, filed June 12, 1933. According to the process of this application, soluble carbohydrate mashes, such as cane molasses mashes, containing ammonia nitrogen and preferably, also, degraded protein nitrogen, are fermented while controlling the acidity of the mash by the addition of alkaline neutralizing agents whereby the final hydrogen ion concentration falls within the range pH 5.0 to pH 6.2. This process gives very satisfactory yields with most soluble carbohydrate mashes, but we have found that in the case of beet molasses mashes the yields are unsatisfactorily low, in most cases, sufficiently so to make the process impractical from a commercial standpoint.

In view of the unusually high nitrogenous content of beet molasses (from 4 to 5 times that of cane molasses) it was thought that an excessive concentration of nitrogenous materials might be responsible for the decreased yield. The elimination of the additional ammonia nitrogen of U. S. Ser. No. 675,459 succeeded in increasing the yield somewhat, but did not give rise to satisfactory commercial yields.

We have now made the surprising discovery that very satisfactory yields may be obtained if additional nitrogen rather than less nitrogen is employed, providing specific types of nitrogenous nutrients are employed. The nutrient which we have found to be especially suitable for the fermentation of beet molasses constitutes the proteinaceous materials from grain alcohol distillery slop. When employing this type of nitrogenous material, according to the process outlined herein, we have been able to secure yields greater than what are thought to be the theoretical values, based on the sugar content of the mashes. This indicates that carbohydrates other than sugars are fermented to some extent and that the beet molasses is therefore utilized to greater commercial advantage than in any previously known fermentation process.

The deficiency in the nitrogenous nutrients in the mash may be satisfied by the addition of the proteinaceous material from grain alcohol slop, either in the form of the whole slop or in the form of concentrated slop, evaporated feed, screened feed, or "distiller's grains". The term "proteinaceous material" in this connection is thus seen to include both the soluble and insoluble forms of nitrogen in the slop. We believe the insoluble form of nitrogen in this material to be the most advantageous, but in general we prefer to utilize both forms of nitrogen by employing whole slop as the supplementary nutrient. This procedure is advantageous from an economical standpoint and the slop may readily be incorporated into the mash by substituting it for a portion of the water.

The grain distillery slops suitable for our process may be those from the malt process, the amylo process, or the acid hydrolysis process. The malt process is exemplified by the common procedure of saccharifying a cereal mash by means of barley malt and the acid hydrolysis process is exemplified by the common procedure of saccharifying such a mash by means of a mineral acid. The amylo process involves saccharification by means of organisms such as *Amyloces rouxii, mucor* or *Rhizopus delemar* as described in the article on this process in Industrial and Engineering Chemistry, 25, 87–89, (1933). The ash content of the slop from the acid hydrolysis process will be found to be considerably higher than that in the other cases owing to the amount of alkali utilized for the neutralization of the mineral acid. However, except in the case of certain samples of beet molasses which have a particularly high alkali content, the ash content of the slop will not necessarily be sufficient to undesirably effect the present process. In general, we prefer to utilize the slop from the malt process since the proportion of unchanged proteins tends to be somewhat higher in this case.

The amount of distillery slop to be added in any fermentation will, of course, depend upon the concentration and state of degradation of the other nitrogenous material present in the mash. For example, a mash containing substantial amounts of cane molasses or other materials containing substantial concentrations of complex nitrogenous matter will require less additional nitrogenous nutrient than one in which beet molasses comprises substantially all of the fermentable carbohydrate. However, in general it may be said that from 5–50% by volume of whole slop or its equivalent of other forms of proteinaceous material derived from the whole slop will usually be found to be satisfactory. From 10–20% by volume will generally be found to be preferable and may advantageously be employed in any mash containing beet molasses as a major source of carbohydrate. In any case, the lower economical limit of slop concentration may easily be determined by preliminary fermentations.

When employing grain alcohol distillery slop as the supplementary nutrient for this fermentation no additional nitrogenous materials need be used. As has been previously mentioned, the addition of ammonia nitrogen is usually detrimental in the fermentation of beet molasses mashes, although relatively low concentrations of this type of nitrogenous nutrient may be present without unduly affecting the yields. It will of course, be apparent to those skilled in the art that the other metabolic requirements of the organisms must be satisfied according to the usual practice in fermentations of this type. For example, if the particular samples of beet molasses and distillery slop do not furnish sufficient phosphates or other mineral nutrients, these materials should be added in the requisite amounts.

An important aspect of the fermentation of beet molasses mashes comprises the acidity control during the fermentation. We have found that the organisms of the type *Clostridium saccharo-acetobutylicum* generally require a more alkaline reaction for the fermentation of beet molasses mashes than for the fermentation of other soluble carbohydrate mashes. In copending application U. S. Ser. No. 675,459 it is stated that for the usual type of soluble carbohydrate mash the acidity should be controlled so that the final hydrogen ion concentration falls within the range pH 5.0 to pH 6.2. However, we have found that for mashes containing beet molasses as a major component the acidity of the fermenting mash should be maintained at a value such that the final hydrogen ion concentration falls within the range pH 5.5 to 7.0 and preferably within the range pH 5.7 to 6.5.

The usual types of beet molasses will be found to contain considerable quantities of alkaline buffering materials and to have an initial alkaline reaction ranging from pH 7.0 to pH 9.0. This degree of alkalinity is usually insufficient to adversely affect the fermentation, and the mashes may be inoculated at their orginal hydrogen ion concentration without the necessity for neutralizing. In fact, we have found that it is generally undesirable to attempt to neutralize the mashes with strong acids such as mineral acids. However, the acidity of the grain alcohol distillery slops, which is believed to be due to the presence of organic acids, is insufficient to adversely affect the fermentation, and these materials may usually be added directly without neutralization.

The alkaline buffering capacity of most types of beet molasses will be found to be sufficient to maintain the acidity within the necessary limits to secure the desired final hydrogen ion concentration. This will generally be true even though a considerable amount of organic acid is added in the grain distillery slop. However, in the case of samples of beet molasses which are deficient in buffering materials, or in case an unduly acid slop is employed, the acidity of the fermenting mash may be controlled by any of the methods disclosed in copending application Ser. No. 675,459. For example, the fermentation may be continuously or semi-continuously neutralized with soluble alkalies, or an insoluble alkaline material may be incorporated into the mash before inoculation. In any case, the necessity for the use of alkaline neutralizing materials and the amounts necessary for optimum yield may readily be determined by preliminary fermentations.

The organisms which are suitable for use in our process are the bacteria of the group *Clostridium saccharo-acetobutylicum*, which are described at length in copending application U. S. Ser. No. 675,459, referred to above. Our process is particularly adapted to fermentations by means of *Clostridium saccharo-acetobutylicum* α which is likewise described in detail in said copending application. Other members of this group of bacteria, such as *Clostridium saccharo-acetobutylicum* β and *Clostridium saccharo-acetobutylicum* α described in copending application Ser. No. 714,633, now Patent No. 2,050,219, issued Aug. 4, 1936, may likewise suitably be employed.

Our invention may perhaps best be illustrated by the following specific examples.

*Example I*

A sterile mash containing approximately 10% of Wisconsin beet molasses (5.10% sugar) and containing 16.3% by volume of grain alcohol distillery slop was inoculated with an actively fermenting culture of *Clostridium saccharo-acetobutylicum* α and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 38.8 | 19.8 | 80.0 | 17.7 | 2.3 |

A control fermentation containing no distillery slop gave a yield of only 8.1% of the total sugar.

*Example II*

A sterile mash containing approximately 10% of Ohio beet molasses (4.82% total sugar) and containing 6.4% by volume of grain alcohol distillery slop was inoculated with an actively fermenting culture of *Clostridium saccharo-acetobutylicum* α and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 40.5 | 19.5 | 73.1 | 24.5 | 2.4 |

The control fermentation in this case gave a yield of 18.8% of the total sugar.

*Example III*

A sterile mash containing approximately 10% of Michigan beet molasses (4.98% total sugar), 12.6% by volume grain alcohol distillery slop, and 0.1% by weight of $(NH_4)_2HPO_4$ was inoculated with an actively fermenting culture of *Clostridium saccharo-acetobutylicum* α and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 38.4 | 19.1 | 79.4 | 17.4 | 3.2 |

The control fermentation, containing the small amount of phosphate but no distillery slop, gave a yield of 30.0% of the total sugar.

Example IV

A sterile mash containing approximately 10% of Ohio beet molasses (4.9% total sugar), 10.5% by volume of grain alcohol distillery slop, and 0.4% by weight of $CaCO_3$ was inoculated with an actively fermenting culture of *Clostridium saccharo-acetobutylicum* α and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 40.5 | 20.3 | 70.4 | 26.2 | 3.4 |

The control experiment containing the same amount of calcium carbonate but no distillery slop gave a yield of 20.6% of the total sugar.

Example V

A sterile mash containing approximately 10% of Ohio beet molasses (4.82% total sugar), 12.3% by volume of grain alcohol distillery slop, and 0.1% by weight of $K_2HPO_4$ was inoculated with an actively fermenting culture of *Clostridium saccharo-acetobutylicum* α and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 41.1 | 19.8 | 72.7 | 24.4 | 2.9 |

The control fermentation, containing the small amount of phosphate but no distillery slop, had a yield of 28.4% of the total sugar.

Example VI

A sterile mash containing 5.06% total sugar (50% Michigan beet molasses—50% hydrol), 16.3% by volume grain alcohol distillery slop, and 0.07% by weight of $(NH_4)_2HPO_4$ was inoculated with an actively fermenting culture of *Clostridium saccharo-acetobutylicum* α and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 35.8 | 18.1 | 73.7 | 22.6 | 3.7 |

The control fermentation, containing the small amount of phosphate but no distillery slop, gave a yield of only 15.6% of the total sugar.

Although our invention is illustrated by the above specific examples, it is to be distinctly understood that it is not limited to the particular materials or procedures described therein. For example, mixed mashes other than beet molasses—hydrol mashes may suitably be employed. Mixed mashes containing beet molasses and cane molasses will often be found to be particularly suited for this fermentation. Our process is applicable, generally, to soluble carbohydrate mashes containing beet molasses as a major component, irrespective of the remaining carbohydrate content. Likewise, it will be apparent to those skilled in the art that various modifications of procedure may be employed without departing from the scope of our invention. For example, if a mixed mash is to be employed, such as the mixed hydrol-beet molasses mash of Example V, the fermentation could suitably be started in the molasses mash and the hydrol-distillery slop solution added to this mash after fermentation had become sufficiently active. The applicability of the various modifications of procedure disclosed in copending application Ser. No. 675,459 will likewise be apparent to one skilled in the art. In general, it may be said that any such modifications or the use of any equivalents which would naturally occur to a skilled bacteriologist or fermentation chemist, may be employed without departing from the scope of our invention.

Our invention now having been described, what we claim is:

1. In the fermentation of an essentially soluble carbohydrate mash containing beet molasses as a major component, by means of bacteria of the group *Clostridium saccharo-acetobutylicum*, the step which comprises effecting the fermentation in a mash containing proteinaceous material from grain alcohol distillery slop.

2. In the fermentation of an essentially soluble carbohydrate mash containing beet molasses as a major component, by means of bacteria of the group *Clostridium saccharo-acetobutylicum*, the step which comprises effecting the fermentation in a mash containing proteinaceous material from grain alcohol distillery slop equivalent to from 5–50% by volume of whole slop.

3. In the fermentation of an essentially soluble carbohydrate mash containing beet molasses as a major component, by means of bacteria of the group *Clostridium saccharo-acetobutylicum*, the step which comprises effecting the fermentation in a mash containing from 10–20% of grain alcohol distillery slop.

4. In the fermentation of an essentially soluble carbohydrate mash containing beet molasses as a major component, by means of bacteria of the group *Clostridium saccharo-acetobutylicum*, the step which comprises effecting the fermentation in a mash containing proteinaceous material from grain alcohol distillery slop, and maintaining the acidity of the fermenting mash at a value such that the final hydrogen ion concentration falls within the range pH 5.5 to 7.0.

5. In the fermentation of an essentially soluble carbohydrate mash containing beet molasses as a major component, by means of bacteria of the group *Clostridium saccharo-acetobutylicum*, the step which comprises effecting the fermentation in a mash containing proteinaceous material from grain alcohol distillery slop equivalent to from 5–50% by volume of whole slop, and maintaining the acidity of the fermenting mash at a value such that the final hydrogen ion concentration falls within the range pH 5.5 to 7.0.

6. In the fermentation of an essentially soluble carbohydrate mash containing beet molasses as a major component, by means of bacteria of the group *Clostridium saccharo-acetobutylicum*, the step which comprises effecting the fermentation in a mash containing from 10–20% of grain alcohol distillery slop, and maintaining the acidity of the fermenting mash at a value such that the final hydrogen ion concentration falls within the range pH 5.5 to 7.0.

7. In the fermentation of an essentially soluble carbohydrate mash containing beet molasses as a major component, by means of bacteria of the group *Clostridium saccharo-acetobutylicum*, the step which comprises effecting the fermentation in a mash containing proteinaceous material from grain alcohol distillery slop, and maintaining the acidity of the fermenting mash at a value such that the final hydrogen ion concentration falls within the range pH 5.7 to 6.5.

8. In the fermentation of an essentially soluble carbohydrate mash containing beet molasses as a major component, by means of bacteria of the group *Clostridium saccharo-acetobutylicum*, the step which comprises effecting the fermentation in a mash containing proteinaceous material from grain alcohol distillery slop equivalent to from 5–50% by volume of whole slop, and maintaining the acidity of the fermenting mash at a value such that the final hydrogen ion concentration falls within the range pH 5.7 to 6.5.

9. In the fermentation of an essentially soluble carbohydrate mash containing beet molasses as a major component, by means of bacteria of the group *Clostridium saccharo-acetobutylicum*, the step which comprises effecting the fermentation in a mash containing from 10–20% of grain alcohol distillery slop, and maintaining the acidity of the fermenting mash at a value such that the final hydrogen ion concentration falls within the range 5.7 to 6.5.

DAVID A. LEGG.
NOBLE R. TARVIN.

Certificate of Correction

Patent No. 2,107,261.     February 1, 1938.

DAVID A. LEGG ET AL.

It is hereby certified that error appears in the printed specification of the above numbered patent requiring correction as follows: Page 2, second column, line 6, for the Greek letter "$\alpha$" (alpha) read $\gamma$ (gamma); and that the said Letters Patent should be read with this correction therein that the same may conform to the record of the case in the Patent Office.

Signed and sealed this 12th day of April, A. D. 1938.

[SEAL]            HENRY VAN ARSDALE,
*Acting Commissioner of Patents.* hydrogen ion concentration falls within the range pH 5.5 to 7.0.

7. In the fermentation of an essentially soluble carbohydrate mash containing beet molasses as a major component, by means of bacteria of the group *Clostridium saccharo-acetobutylicum*, the step which comprises effecting the fermentation in a mash containing proteinaceous material from grain alcohol distillery slop, and maintaining the acidity of the fermenting mash at a value such that the final hydrogen ion concentration falls within the range pH 5.7 to 6.5.

8. In the fermentation of an essentially soluble carbohydrate mash containing beet molasses as a major component, by means of bacteria of the group *Clostridium saccharo-acetobutylicum*, the step which comprises effecting the fermentation in a mash containing proteinaceous material from grain alcohol distillery slop equivalent to from 5–50% by volume of whole slop, and maintaining the acidity of the fermenting mash at a value such that the final hydrogen ion concentration falls within the range pH 5.7 to 6.5.

9. In the fermentation of an essentially soluble carbohydrate mash containing beet molasses as a major component, by means of bacteria of the group *Clostridium saccharo-acetobutylicum*, the step which comprises effecting the fermentation in a mash containing from 10–20% of grain alcohol distillery slop, and maintaining the acidity of the fermenting mash at a value such that the final hydrogen ion concentration falls within the range 5.7 to 6.5.

DAVID A. LEGG.
NOBLE R. TARVIN.

Certificate of Correction

Patent No. 2,107,261.   February 1, 1938.

DAVID A. LEGG ET AL.

It is hereby certified that error appears in the printed specification of the above numbered patent requiring correction as follows: Page 2, second column, line 6, for the Greek letter "$\alpha$" (alpha) read $\gamma$ (gamma); and that the said Letters Patent should be read with this correction therein that the same may conform to the record of the case in the Patent Office.

Signed and sealed this 12th day of April, A. D. 1938.

[SEAL]   HENRY VAN ARSDALE,
*Acting Commissioner of Patents.*

Certificate of Correction

Patent No. 2,107,261. February 1, 1938.

DAVID A. LEGG ET AL.

It is hereby certified that error appears in the printed specification of the above numbered patent requiring correction as follows: Page 2, second column, line 6, for the Greek letter "$\alpha$" (alpha) read $\gamma$ (gamma); and that the said Letters Patent should be read with this correction therein that the same may conform to the record of the case in the Patent Office.

Signed and sealed this 12th day of April, A. D. 1938.

[SEAL]

HENRY VAN ARSDALE,
*Acting Commissioner of Patents.*